Patented Sept. 27, 1932

1,879,373

UNITED STATES PATENT OFFICE

HERBERT McCOMB, OF GARY, INDIANA

METHOD OF UTILIZING CERTAIN BY-PRODUCTS OF IRON AND STEEL PLANTS

No Drawing.   Application filed September 23, 1931.   Serial No. 564,713.

The present invention relates to the utilization of by-products of the iron and steel industry, and more especially to the recovery of iron bearing constituents and compounds from certain of such products which contain relatively large quantities thereof.

In modern iron and steel plants, the various units such as blast furnaces, coke ovens, rolling mills, pickling machines, and other mechanisms necessary for carrying out certain processes are, for purposes of economy and efficiency, usually located relatively close together, and this invention is therefore directed to a method of utilizing certain by-products of blast furnaces, pickling machines, and coke ovens particularly in plants in which such products may be received directly from their respective points of origin, the invention being especially concerned with the recovery of iron bearing constituents therefrom and their incorporation into conglomerate bodies adapted for re-charging into a blast furnace in conjunction with the iron ore usually employed.

It is well known that blast furnace flue gas contains relatively large quantities of occluded solids in the form of flue dust, the amount of which may be about 200 lbs. per ton of pig iron produced, this dust usually being approximately 60% by weight of finely divided oxides of iron. The iron content of the flue dust may therefore be, and usually is, about 45% of the total weight of the flue dust, and it is therefore obvious that relatively large quantities of iron, that is, about 4% of the weight of the pig iron, may be carried from the blast furnace by the flue gas. In the ordinary practice, most of this flue dust is deposited in the dust catchers through which the flue gas is passed upon issuing from the blast furnace, while substantially all of the remainder of the dust is thereafter removed from the gas during subsequent washing in the gas washers. Heretofore, the principal object of removing the dust from the gas has been to produce clean gas which may subsequently be used for combustion, while the material incidentally removed in the cleaning process is usually disposed of by mixing the dry dust from the dust catchers with the mud formed by the settling of the finer particles from the gas washing water, additional water up to about 10% by weight being introduced to produce a plastic cohesive mass, which is then sintered to drive off the water and thereafter re-charged into the blast furnace.

Similarly, the principal by-product of pickling tanks used for cleaning the various iron and steel shapes produced in the plant is the spent pickle liquor, which is a solution rich in iron sulphates, resulting from the reaction of the sulphuric acid of fresh pickle liquor with the iron of the objects being pickled and with the scale carried thereby. It has heretofore been the practice to dispose of such spent pickle liquor by any means available, substantially without any expectation of a return proportionate with its cost, and as no commercially practical method has been devised for recovering the relatively large amount of iron in solution therein, it is usually sold for whatever price it will bring.

Another waste product of importance to my invention is the alkaline solution known as "still waste" which has heretofore usually been discharged into a sewer from the ammonia stills of the coking plant. No iron is recoverable therefrom, however, and in my invention it is employed merely to assist in the recovery of iron from the iron bearing waste products previously referred to, thus incidentally avoiding the necessity of disposing of quantities of this strongly alkaline solution.

A principal object of my invention, therefore, is to provide an improved method whereby certain waste or by-products of the iron and steel industry may be utilized to advantage and the loss of valuable constituents thereof avoided.

A further object of my invention is to provide a method of combining spent pickle liquor and blast furnace dust to produce a conglomerate material having a relatively high iron content and in such form as to permit of its being readily charged into a blast furnace.

Other objects, purposes and advantages of my invention will hereinafter be more particularly referred to or will be apparent from the following description of a preferred manner of performing it and of certain modifications thereof which may be employed if desired.

The flue dust which is given off by blast furnaces and carried therefrom by the furnace gas is composed of a mixture of approximately ten different compounds, including oxides of iron, iron sulphide, carbon, silicon dioxide and others. A large portion of the flue dust, especially the coarser particles thereof, is ordinarily extracted from the gas in pockets in the flues known as "dust catchers", from which it is removed as occasion requires. In accordance with my invention the dust is then placed in a pug mill, in which it is agitated by means of a rotating shaft provided with radially extending vanes during the addition of a suitable quantity of spent pickle liquor thereto. The particular proportion of spent pickle liquor employed is capable of considerable variation but I prefer to use, for example, about 20% spent pickle liquor to about 80% flue dust by weight; in other words, an amount of pickle liquor equal to about one-fourth the weight of the flue dust, as when these proportions are used the mixture is discharged from the pug mill as a plastic mass which may be readily deposited in a layer of uniform thickness on a continuously moving grate by means of which it is carried into a sintering plant desirably disposed closely adjacent the pug mill. The sintering operation, which may comprise the subjection of the material to the direct action of a heating flame, is effective to drive off the moisture within the mixture and also to heat it sufficiently to convert the iron sulphate residue from the pickle liquor principally into $Fe_2O_3$. As flue dust is usually about 45% iron by weight and $Fe_2O_3$ is approximately 70% iron, it is apparent that the percentage of iron in the sintered mixture is considerably higher than that in flue dust alone, and although the iron content of the mixture will vary to some extent according to the proportion of pickle liquor employed, it is nevertheless appreciably increased whenever sufficient liquor is added to the dust to form a plastic, somewhat cohesive mass, irrespective of the exact quantity used. Substantially all the iron carried by the pickle liquor is thus recovered, while the relatively higher iron content contributed to the sintered mixture by its presence therein produces appreciably greater cohesion than when the flue dust prior to sintering is mixed with water or some other moistening medium relatively free from iron. This greater cohesion of the product of my method permits the formation of relatively large lumps thereof, such as are usually preferred for charging into the blast furnace, whereby the charging quality of the material is appreciably improved.

The description of my invention has thus far included only the utilization of the coarser particles of the flue dust which are received in a dry state from the dust catchers and moistened with spent pickle liquor; an additional feature, however, includes the utilization of pickle liquor in recovering the iron from the relatively fine dust removed from the flue gas by means of the washing water in the gas washers through which the gas is customarily directed after passing from the dust catchers. This water carries with it substantially all the occluded solids remaining in the gases after their passage from the dust catchers, the particles being in suspension in the water in such finely divided condition as to be practically in a colloidal state. The washing water is therefore usually introduced in accordance with customary practice, into a Dorr thickener or equivalent apparatus in which the water is held motionless for a sufficiently long period to enable most of the solid particles to settle to the bottom and, in accordance with my method, a quantity of spent pickle liquor is also introduced into the Dorr thickener with the washing water and sufficient alkaline still waste from the ammonia stills added to neutralize the acidity of the pickle liquor. The principal alkaline constituent of the still waste being calcium hydroxide, or lime water, it reacts with the iron sulphate in solution in the pickle liquor to form an iron hydroxide as a flocculent precipitate, thus solidifying the iron content of the pickle liquor and perhaps, to some extent, assisting in the precipitation of the flue dust from its colloidal suspension in the washing water. The residue deposited at the bottom of the thickener tanks is a viscous mud containing principally the insoluble constituents of the flue dust including oxides of iron, and also the iron hydroxides produced by the reaction of the pickle liquor with the still waste. Upon being withdrawn from the thickener, this mud is filtered to remove excess liquid and thereafter transferred to the pug mill, in which it is desirably mixed with the coarser flue dust received from the dust catchers and contributes to form the conglomerate mass subsequently sintered and re-charged into the furnace as hereinabove described. The addition of the thickener residue to the mixture in the pug mill does not substantially alter the chemical composition of the sintered material, for the reason that the heating during the sintering operation is sufficient to convert the iron hydroxide in the thickener mud into iron oxides which thus increase the iron content of the material coming from the gas washers in a manner generally similar to the increase effected in the iron content of the material received from the dust catchers through the use of the spent pickle liquor as hitherto described.

Thus, through the medium of my invention, I am able to recover in a form eminently suitable for blast furnace charging substantially all of the iron contained in a considerable portion, at least, of the total quantity of spent pickle liquor produced in a given plant as well as in substantially all of the flue dust carried by the blast furnace exhaust gases, yet at a cost not materially greater than is entailed by the present method of iron recovery from the flue dust alone; the practice of the invention, therefore, not only avoids the necessity for selling the spent pickle liquor for whatever price can be obtained in a variable and uncertain market, but effects a substantial increase in the operating economy of the plant as a whole.

Although in the above description I have referred to the charging of the pickle liquor into the pug mill directly as an operation distinct from that of charging pickle liquor and still waste into the Dorr thickener or equivalent apparatus, in practice these two operations will usually be carried on continuously and simultaneously. However, although I thus consider my invention to be of greatest utility when pickle liquor is employed both as a binder and moisture in the pug mill and also to produce a flocculent precipitate of iron hydroxide in the Dorr thickener and my method may therefore most advantageously be carried out by the combined performance of both of these steps, it will be understood that one or the other may be eliminated without seriously impairing the effectiveness of the step which is retained, and my invention therefore comprises the utilization of both of these steps in coordination and combination as well as their utilization separately and independently of each other, while other variations in the particular manner of performing the several operations, and in the proportions of the various ingredients used, may also be introduced, without departing from the spirit and scope of the invention as defined in the appended claims.

Having thus described my invention, I claim and desire to protect by Letters Patent of the United States:

1. The method of utilizing spent pickle liquor which comprises the steps of intermixing a sufficient quantity thereof with a finely divided iron bearing material to form a plastic mass, and then sintering the mixture.

2. The method of utilizing spent pickle liquor which comprises the steps of adding said liquor to relatively dry iron bearing flue dust, mixing said ingredients together to form a plastic cohesive mass, and then sintering the mixture at a temperature sufficiently great to convert the contained ferrous sulphate into iron oxide.

3. The method of utilizing spent pickle liquor which comprises the steps of adding said liquor to a suspension of iron bearing flue dust in water in the presence of an alkali to thereby precipitate iron hydroxide, settling out the suspended solids, and thereafter sintering said solids to convert the said hydroxides into iron oxide.

4. In a method of utilizing spent pickle liquor, the step of moistening dry iron bearing flue dust with a quantity of said liquor, mixing said ingredients together to form a plastic mass, and thereafter sintering said mass to convert iron bearing constituents thereof into oxides of iron.

5. The method of forming furnace charging material from iron bearing flue dust which comprises the steps of intermixing the flue dust with spent pickle liquor to form a plastic mass of uniform consistency, and then sintering said mass to destroy its plasticity and convert iron compounds contained therein into iron oxide.

6. The method of forming furnace charging material from iron bearing flue dust which comprises the steps of intermixing a solution of an acid salt of iron, an alkaline solution, and water containing iron bearing flue dust in suspension, removing solid ingredients from said mixture, and thereafter sintering said solid ingredients.

7. In a method of forming furnace charging material from an aqueous suspension of iron bearing flue dust, the steps of intermixing spent pickle liquor and an alkali in said suspension to thereby precipitate iron hydroxide, removing excess water from said precipitate and the accompanying solids, and thereafter sintering the residue to thereby convert said hydroxide into iron oxide.

8. The method of recovering iron from spent pickle liquor in a form suitable for furnace charging, which comprises the steps of mixing said liquor with iron bearing flue dust, removing excess moisture from the mixture, and then sintering the residue until a dry, relatively highly cohesive mass is produced.

9. The method of recovering iron from spent pickle liquor in a form suitable for furnace charging, which comprises the steps of mixing said liquor with an aqueous suspension containing iron bearing flue dust, removing excess moisture from the mixture, and then sintering the residue until a dry, relatively highly cohesive mass is produced.

10. The method of recovering iron from spent pickle liquor and iron bearing flue dust in a form suitable for furnace charging, which comprises the steps of mixing certain of said liquor with said dust when in dry condition, mixing other of said liquor with an aqueous suspension of said dust, removing excess moisture from the last mentioned mixture, then combining said mixtures to form a plastic mass, and finally sintering the mass until a dry, relatively highly cohesive product results.

11. The method of recovering iron from spent pickle liquor and iron bearing flue dust in a form suitable for furnace charging, which comprises the steps of mixing certain of said liquor with said dust when in dry condition, mixing other of said liquor with an aqueous suspension of said dust in the presence of an alkali, removing excess moisture from the last mentioned mixture, then combining said mixtures in a cohesive plastic mass, and finally sintering the mass until a dry, relatively highly cohesive product results.

In witness whereof, I have hereunto set my hand this 11th day of September, 1931.

HERBERT McCOMB.